United States Patent [19]

Hiramoto

[11] Patent Number: 4,579,184
[45] Date of Patent: Apr. 1, 1986

[54] RESILIENTLY MOUNTED RADIATOR ASSEMBLY

[75] Inventor: Nobuo Hiramoto, Hiroshima, Japan

[73] Assignee: Mazda Motor Corporation, Hiroshima, Japan

[21] Appl. No.: 645,265

[22] Filed: Aug. 29, 1984

[30] Foreign Application Priority Data

Sep. 2, 1983 [JP] Japan .................. 58-136775[U]

[51] Int. Cl.⁴ .......................... B60K 11/04; F01P 3/18
[52] U.S. Cl. ..................... 180/68.4; 165/67; 248/232; 248/635
[58] Field of Search ............... 180/68.4, 68.6; 165/41, 165/67, 69; 248/232, 634, 635

[56] References Cited

U.S. PATENT DOCUMENTS

| 3,121,467 | 2/1964 | Bryant | 180/68.4 |
| 3,123,170 | 3/1964 | Bryant | 248/232 X |
| 3,261,422 | 7/1966 | Jensen | 248/634 X |
| 4,066,119 | 1/1978 | Stedman | 180/68.4 X |
| 4,121,682 | 10/1978 | Schaal et al. | 180/68.4 |

FOREIGN PATENT DOCUMENTS

| 2634990 | 2/1978 | Fed. Rep. of Germany | 180/68.4 |
| 57-60911 | 4/1982 | Japan | 180/68.4 |
| 57-84223 | 5/1982 | Japan | |
| 667353 | 2/1952 | United Kingdom | 248/634 |
| 924136 | 4/1963 | United Kingdom | 248/634 |

Primary Examiner—Robert G. Nilson
Attorney, Agent, or Firm—Burns, Doane, Swecker and Mathis

[57] ABSTRACT

A resilient mounting for a radiator assembly in an automotive vehicle including rigid upper and lower support members, comprising a lower support provided on the lower support member and including at least one cushioning member for the support of the radiator assembly from below, at least one generally cylindrical protuberance formed on the radiator assembly at a location opposite to the lower support, at least one generally elongated plate secured to the upper support member and having a mounting hole defined therein, and at least one elastic mount comprised of a generally cylindrical hollow body and a pliable mounting flange protruding radially outwardly from the hollow body. The elastic mount is mounted on the plate with the outer periphery of the mounting flange engaged to the peripheral lip region of the plate which defines the mounting hole, while the protuberance is resiliently received in the hollow body.

10 Claims, 7 Drawing Figures

RESILIENTLY MOUNTED RADIATOR ASSEMBLY

BACKGROUND OF THE INVENTION

The present invention generally relates to a radiator assembly in an automotive vehicle and, more particularly, to a mounting for resiliently supporting the radiator assembly on a body structure of the automotive vehicle.

For the purpose of minimizing the transfer of jars and vibrations to the radiator assembly and also for the purpose of minimizing the resonant vibration of the radiator assembly induced by a low frequency vibration generated during the operation of the vehicle, it has long been well known to support the radiator assembly resiliently in a "floating" fashion giving latitude of movement within a limited distance in any direction. By way of example, U.S. Pat. No. 3,121,464 and No. 3,123,170, patent Feb. 18, 1960, and Mar. 3, 1964, respectively, disclose a resilient radiator mounting comprising generally U-shaped brackets in combination with respective cushioning strips. According to these patents, the radiator assembly is supported with its bottom portion received in the two brackets through the respective cushioning strips and with its top portion similarly received in the only bracket through the cushioning strip. The two brackets supporting the radiator assembly from below are rigidly mounted in spaced relation to each other on a lower transverse brace forming a part of the automobile body structure whereas the bracket holding the top portion of the radiator assembly is secured to a generally elongated plate member having one end remote from the bracket rigidly secured to an upper transverse brace which also forms a part of the automobile body structure.

As an alternative method, the second mentioned U.S. patent also discloses the use of cushioning annuli; one for each bracket, in combination with respective cylindrical protuberances rigidly secured by welding to the radiator assembly. In the alternative method, the cushioning annuli are inserted and received in the respective brackets, and the radiator assembly is supported with the cylindrical protuberances press-fitted into the respective annuli.

U.S. Pat. No. 4,121,682, patented Oct. 24, 1984, discloses a radiator assembly having a pair of cylindrical protuberances rigid with the radiator assembly and extending downwardly from the bottom thereof and a pair of lugs integral with an upper portion, specifically, a casing for the top header tank, of the radiator assembly. The radiator assembly according to this U.S. patent is mounted on the lower transverse brace with the cylindrical protuberances inserted into respective cushioning annuli which are in turn inserted in associated perforations defined in the lower transverse brace. On the other hand, the lugs integral with the casing for the top header tank are connected with the upper transverse brace, located on one side of the radiator assembly adjacent the top header tank, by means of respective, generally U-shaped clip members with the intervention of associated cushioning sleeves each positioned inwardly of the respective clip member and surrounding the respective lug so as to avoid a metal-to-metal contact between the lug and the upper transverse brace.

Japanese Laid-open Patent Publication No. 57-60911, published Apr. 13, 1982, discloses a resilient radiator mounting wherein the radiator assembly is supported either frontwardly or rearwardly of both of the upper and lower transverse braces and is, for this purpose, provided with four arms rigidly secured to and generally laterally outwardly protruding from the respective corner areas of the radiator assembly. Of these arms, the upper arms have respective perforations defined therein and have respective cushioning annuli received in those perforations, which annuli are in turn mounted on respective metal collars fast with the upper transverse brace. The remaining lower arms are received in metallic seat members rigidly secured thereto, each of said seat members having integrally formed therewith a respective cylindrical protuberance which is received in a respective cushioning pad mounted on a respective cup-like member rigid or fast with the lower transverse brace.

Japanese Laid-open Patent Publication No. 57-84223, published May 26, 1982, discloses a radiator assembly mounted resiliently on the lower transverse brace in a manner generally similar to that disclosed in the third mentioned U.S. Patent, and having a pair of spaced flange members rigidly secured to an upper portion of the radiator assembly so as to extend upwardly therefrom. The upper transverse brace carries a pair of bolt members each having one end secured thereto through a cushioning member and the other end adapted to receive a fastening nut in a manner with the respective flange member sandwiched between the cushioning member and the nut then fastened to the bolt.

In particular, both of the Japanese patent publications referred to above disclose the use of the radiator mounting system for a dynamic damper for suppressing a low frequency vibration generated in the automobile body structure during the operation thereof. As is well known to those skilled in the art, during a low speed operation of the automobile engine, vibrations induced by the engine tend to be transmitted to the body structure and, consequent thereupon, a front portion of the body structure around an engine compartment undergoes a shaking motion in a direction generally perpendicular to the longitudinal sense of the body structure. This shaking motion of the front portion of the body structure is said to be capable of being minimized or suppressed if either a separate dynamic damper is employed for counteracting with the low frequency vibration or the rigidity of the body structure is increased. However, according to both of the abovementioned Japanese patent publications, an attempt has been made to suppress the shaking motion by supporting the radiator resiliently in a floating fashion by the use of a resilient mounting system and allowing the system to act concurrently as a dynamic damper effective to counteract with the low frequency vibration generated by the low speed operation of the engine.

However, so far as the disclosure of each of the previously mentioned Japanese patent publications is concerned, relatively complicated mounting procedures are required to allow the radiator assembly to be resiliently secured to the upper and lower transverse braces forming respective parts of the automobile body structure because fastening elements such as bolts or nuts have to be threaded exteriorly from a horizontal direction. Moreover, in view of the fact that the upper cushioning annuli or members through which the upper arms or flange members rigid with the radiator assembly are carried by the upper transverse brace, the mounting system disclosed therein can not accommodate any radiator assembly having the upper arms or flange members located at different positions and is, therefore, limited for use with a particular design of radiator assembly.

SUMMARY OF THE INVENTION

The present invention has for its essential object to provide an improved resilient mounting for a radiator assembly, which is effective to facilitate the efficient and ready installation of the radiator assembly on an automotive vehicle body structure.

Another important object of the present invention is to provide an improved resilient mounting of the type referred to above, having a relatively large latitude of accommodating an error in installation and mounting of the radiator assembly.

A further object of the present invention is to provide an improved resilient mounting of the type referred to above, which can effectively serve as a dynamic damper for suppressing the low frequency vibration induced by an automobile engine during the operation thereof.

In order to accomplish these objects, there is provided a resilient mounting for a radiator assembly used in a vehicle including generally elongated, rigid upper and lower support members, which comprises a lower support means provided on the lower rigid support member and including at least one cushioning member for the support of the radiator assembly from below, at least one generally cylindrical protuberance formed on a portion of the radiator assembly at a location opposite to the lower support means, a generally elongated plate member secured at one end to the upper rigid support member and protruding therefrom to a position immediately above the protuberance on the radiator assembly, and an elastic mount comprised of a generally cylindrical hollow body and a mounting flange protruding radially outwardly from the hollow body. The plate member has a mounting hole defined in a portion thereof adjacent the other end thereof, and the elastic mount is supported by the plate member with the hollow body extending through the mounting hole while the mounting flange is coaxially connected to the peripheral lip region of the plate member defining the mounting hole. With the elastic mount so supported by the plate member, the protuberance on the radiator assembly is received in the hollow of the hollow body.

Preferably, the mounting flange has a thin walled area for the purpose of reducing the coefficient of elasticity thereby to facilitate the axial oscillatory displacement of the cylindrical hollow body relative to the outer periphery of the mounting flange.

Also, the cylindrical follow body is preferably formed with at least one crest radially inwardly projecting from the inner peripheral surface of the hollow body for engagement with the protuberance so that any possible error in alignment between the protuberance and the cylindrical hollow body can advantageously be accommodated.

Moreover, the cylindrical hollow body is preferably formed with an outwardly flared hold-down flange protruding from one end thereof for resiliently depressing the radiator assembly in a direction towards the cushioning member.

It should be noted that, while the resilient mounting system according to the present invention can exhibit a satisfactory performance in that the transmission of jars and vibrations from the vehicle body structure to the radiator can be minimized, the system as a whole including the radiator assembly can also be used as a dynamic damper effective to suppress the shaking motion of the front portion of the body structure if the cushioning member and the elastic mount are selected to have a coefficient of elasticity which satisfies such an equation as disclosed in the last mentioned Japanese patent publication.

BRIEF DESCRIPTION OF THE DRAWINGS

These and other objects and features of the present invention will be readily understood from the following description taken in conjunction with preferred embodiments thereof with reference to the accompanying drawings, in which.

DETAILED DESCRIPTION OF THE EMBODIMENTS

Figure 1:
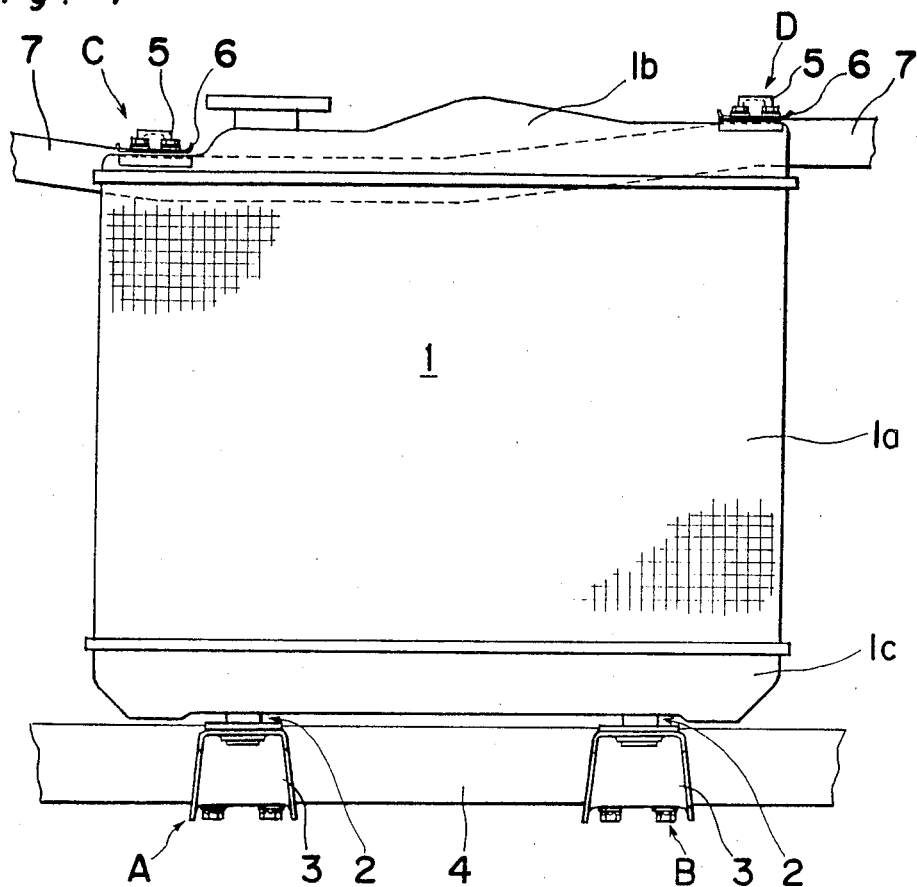
FIG. 1 is a front elevational view of an automobile-mounted radiator assembly showing the manner by which it is resiliently supported between upper and lower transverse braces forming respective parts of an automobile body structure.

Before the description of the present invention proceeds, it is to be noted that like parts are designated by like reference numerals throughout the accompanying drawings.

Referring first to FIGS. 1 to 4, an automobile body structure, particularly a front body structure, includes lower and upper transverse braces 4 and 7 both extending transversely of the longitudinal sense of an automobile so as to connect side frame members together. An automobile radiator assembly 1 comprising a heat-exchange core 1a of generally rectangular shape and upper and lower header tanks 1b and 1c is supported between these transverse braces 4 and 7 in a "floating" fashion at four locations designated by A, B, C and D. The radiator assembly 1 has a plurality of, for example, four, generally cylindrical protuberances 8 and 9, the two protuberances 8 being formed integrally with, or otherwise rigidly secured to, the bottom of the lower header tank 1c so as to extend downward therefrom in spaced relation to each other whereas the protuberances 9 are formed integrally with, or otherwise rigidly mounted on, the top of the upper header tank 1b so as to extend upwardly therefrom in spaced relation to each other.

The lower transverse brace 4 has two spaced apart upholding brackets 3 of identical construction rigidly secured thereto and generally upwardly curved so as to extend frontwardly of the transverse brace 4 with respect to the automobile body structure. Each of these brackets 3 has an aperture defined at 3a, into which aperture 3a a respective elastic collar 2 is inserted. So far shown, the respective elastic collar 2 for each of the upholding brackets 3 comprises a generally cylindrical sleeve 2a having a radially outwardly extending flange 2b and is mounted on the associated bracket 3 with its lower end inserted through the aperture 3a and with its flange 2b resting on the top of the upholding bracket 3. It is to be noted that brackets 3 are spaced from each other a distance required for the lower protuberances 8 to be press-fitted into the hollows of the elastic collars 2, respectively. In any event, the lower elastic mounts, employed at the respective locations A and B, for the support of the radiator assembly 1 from below may not be always limited to that shown and described, but may be of any known structure such as disclosed in, for example, any one of U.S. Pat. No. 3,123,170 and No. 4,121,682 and Japanese Laid-open Patent Publications No. 57-60911 and No. 57-84223, all referred to hereinbefore. In addition, the lower elastic mounts may be provided directly on the lower transverse brace 4 depending on the design of a particular automobile body structure, provided that, when the radiator assembly is mounted thereon, it can be given latitude of movement within a limited distance in any direction without separating therefrom.

The upper transverse brace 7 of generally U-shaped cross-section having a horizontally lying top wall 7b and a pair of side walls 7a and 7c extending downwardly from the opposite side edges of the top wall 7b has a pair of generally rectangular hold-down plates 6 of identical construction secured thereto in spaced relation with each other for the support of the radiator assembly 1 from above at the respective locations C and D. Each of the hold-down plates 6 is of one-piece construction formed by the use of any known press work from a rectangular metal strip so as to have a bent end 6a to be held in abutment with the side wall 7a of the transverse brace 7, a first flat end portion 6b to be held flat against the top wall 7b of the transverse brace 7, a second flat end portion 6d, an inclined intermediate portion 6c connecting between the first and second flat end portions 6b and 6d, and a peripheral upstanding flange 6e surrounding the respective plate 6 except for the bent end 6a for reinforcing the respective plate 6. The first and second flat end portions 6b and 6d of each hold-down plate 6, which are integrally connected together by the inclined intermediate portion 6c, are stepped one above the other such that, when the respective hold-down plate 7 is mounted on the transverse brace 7 with the first flat end portion 6b secured to the top wall 7b in a manner as will be described later, the second flat end portion 6d can be positioned immediately above the radiator assembly 1 and at a level above the first flat end portion 6b. For the purpose as will become clear from the subsequent description, each of the hold-down plates 6 has a pair of slots 6f and 6g defined in the first flat end portion 6b and also a mounting hole 6h defined in a peripheral lip region 6i in the second flat end portion 6d.

Figure 4:
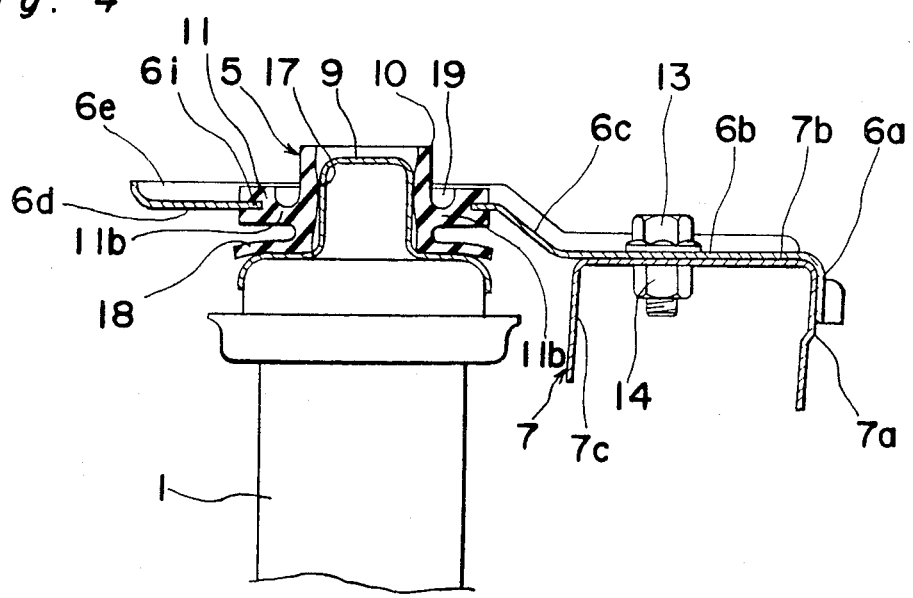
FIG. 4 is a cross-sectional view taken along the line IV—IV in FIG. 3.
Figure 2:
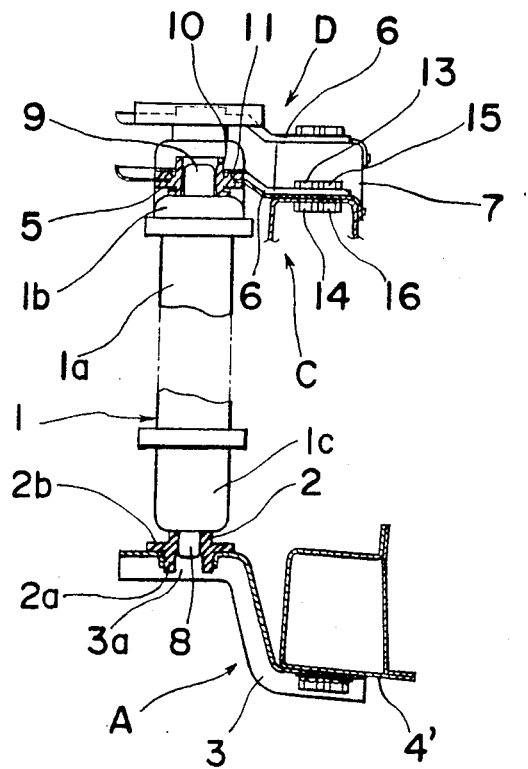
FIG. 2 is a partially sectioned side view of the radiator assembly shown in FIG. 1.
Figure 3:
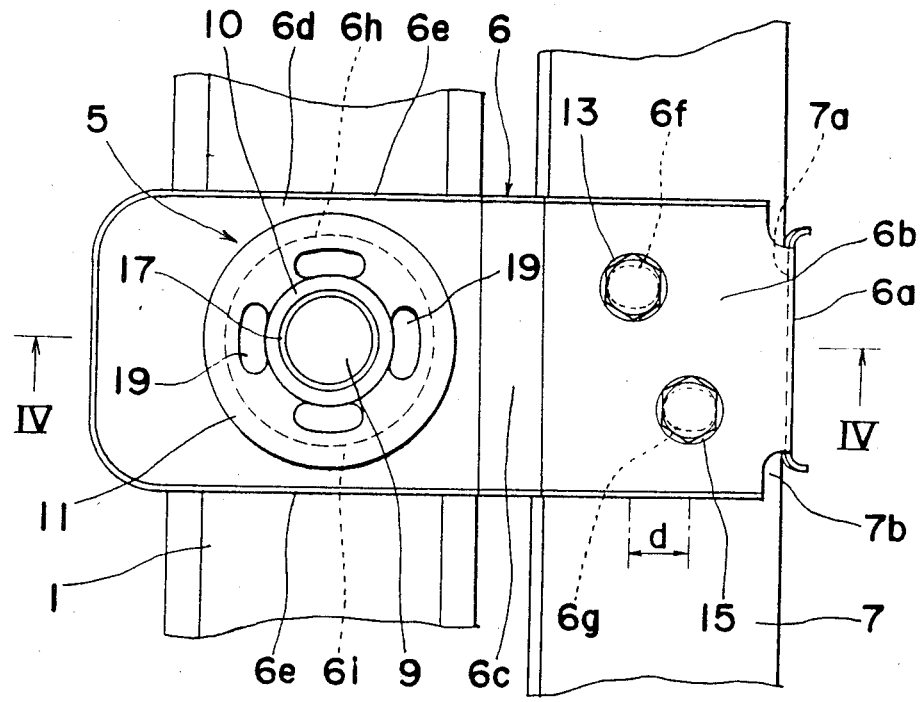
FIG. 3 is a top plane view, on an enlarged scale, showing one of the two upper hold-down units shown in FIGS. 1 and 2.

The hold-down plates 6 carry respective upper elastic mounts of identical construction generally identified by 5, for the resilient support of the radiator assembly 1 from above. As best shown in FIGS. 3 and 4, each of the upper elastic mounts 5 is of one-piece construction, preferably made of rubber, and comprising a generally cylindrical hollow body 10 of an outer diameter smaller than the diameter of the mounting hole 6h, a mounting flange 11 of a predetermined thickness, integral therewith and extending radially outwardly from a substantially intermediate portion of said body 10, and a hold-down flange 18 integral with and outwardly flared from one end of the body 10. Each of the elastic mounts 5 of the construction described above is inserted in the mounting hole 6h in the second flat end portion 6d of the respective hold-down plate 6 and carried thereby in a manner with the peripheral lip region 6i wedged circumferentially exteriorly into the mounting flange 11.

The mounting of the upper elastic mounts 5 on the respective hold-down plates 6 in the manner described above can be achieved in any known method, for example, by molding them in situ on the associated hold-down plate 6 and then vulcanizing them. Alternatively, it can be achieved by provided a circumferential groove of a width slightly smaller than the thickness of the peripheral lip region 6i in each of the hold-down plates 6, then inserting the respective elastic mount 5 in the mounting hole 6h in the corresponding hold-down plate 6 which the respective elastic mount 5 generally radially inwardly deformed against its own resiliency, and letting the deformed elastic mount 5 restore to the original shape while permitting the peripheral lip region 6i to wedge into the circumferential groove in the mounting flange 11. In either case, the outwardly flared hold-down flange 18 should be oriented downwards as it is adapted to contact and cover the top surface of the upper header tank 1b.

For maximizing the performance of the resilient mounting system for the automobile radiator, that is, both minimizing the transmission of jars and vibrators to the radiator assembly and maximizing the services of the radiator assembly as a dynamic damper for suppressing the vibration occurring in the automobile as a whole, each of the elastic mounts 5 has a support crest 17 integral with the cylindrical hollow body 10 and radially inwardly protruding therefrom into the hollow of the cylindrical hollow body 10 so as to constrict the hollow to a diameter slightly smaller than the outer diameter of the associated protuberance 9 on the upper header tank 1b. In addition to the provision of the radially inwardly extending support crest 17, the mounting flange 11 in each of the elastic mounts 5 is formed with a plurality of equally spaced recesses 19 arranged coaxially around the cylindrical hollow body 10 and extending inwardly of the mounting flange 11 in a direction parallel to the longitudinal axis of the mounting flange 11 thereby leaving an equal number of thin-walled areas 11b as best shown in FIG. 4. It will readily be understood that the provision of the recesses 19 is effective to reduce the coefficient of elasticity of the mounting flange 11 even though the latter has a substantial thickness and, therefore, effective to permit the mounting flange 11 to be readily pliable to enhance the cushioning effect.

Instead of the employment of the recesses 19, slots each extending completely through the thickness of the mounting flange 11 may be employed. Alternatively, as best shown in FIG. 7, the recesses 19 may be employed in combination with slots 19a extending completely through the thickness of the mounting flange 11, in which case the recesses 19 and the slots 19a are to be preferably arranged alternately. Moreover, instead of the employment of the spaced recesses 19, a single annular recess may be employed such as shown by 20 in FIGS. 6 and 7. Even any of these alternative methods is effective to reduce the coefficient of elasticity of the mounting flange 11 in each of the upper elastic mounts 5. The importance of the mounting flange 11 in each elastic mount 5 having a relatively small coefficient of elasticity will be discussed later.

Figure 5:
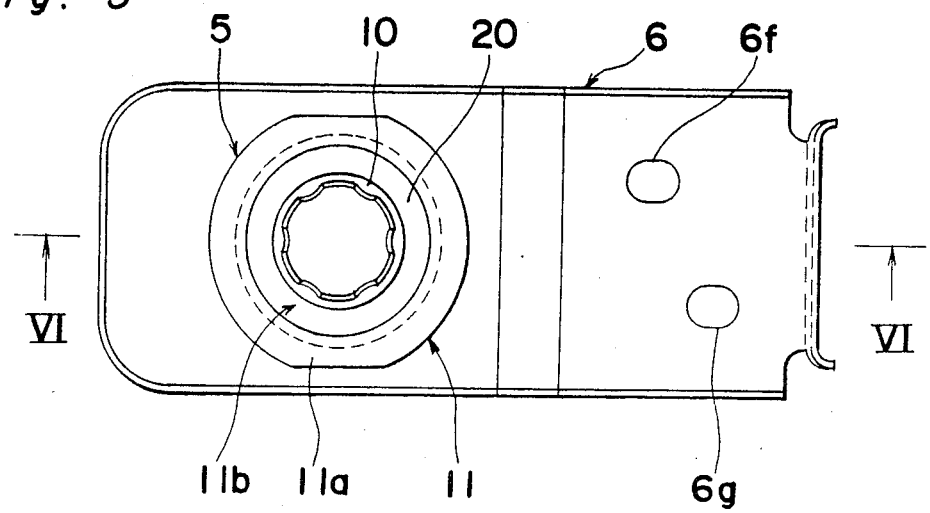
FIG. 5 is a view similar to FIG. 3, showing the hold-down unit according to a different embodiment of the present invention.
Figure 6:
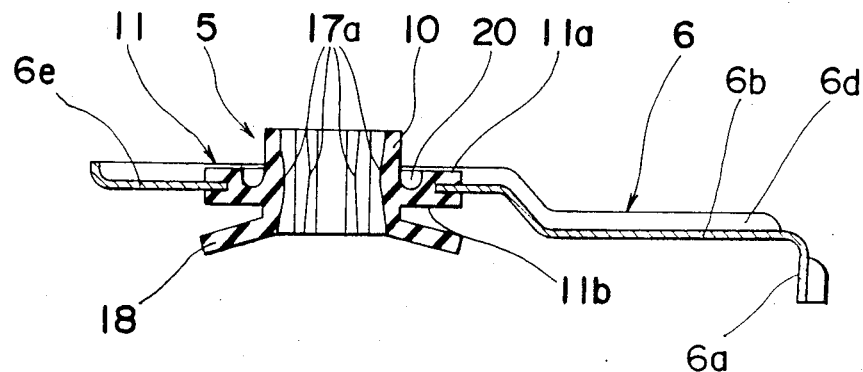
FIG. 6 is a cross-sectional view taken along the line VI—VI shown in FIG. 5.
Figure 7:
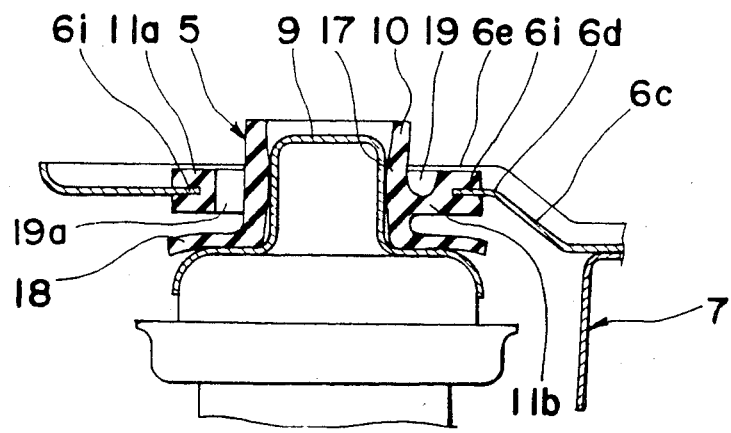
FIG. 7 is a view similar to FIG. 4, showing a further embodiment of the present invention.

In the embodiment shown in FIGS. 5 and 6, instead of the single radially inwardly protruding crest 17 employed in the foregoing embodiment, a plurality of circumferentially equally spaced, generally parallel crests 17a are employed so as to protrude radially inwardly from the inner peripheral surface of the cylindrical body 10 into the hollow thereof.

While each of the upper elastic mounts 5 is so constructed and so shaped as hereinbefore described, the hold-down plates 6 carrying the respective elastic mounts 5 are mounted on the upper transverse brace 7 in transversely spaced relation to each other with the respective first flat end portions 6c secured to the top wall 7b of the transverse brace 7 by the use of two sets of bolts 13 and nuts 14 for each hold-down plate 6. During the mounting of the hold-down plates 6 on the upper transverse brace 7 in the manner as hereinabove described, the protuberances 9 on the top of the upper header tank 1b, while the latter is mounted on the upholding brackets 3 by means of the lower elastic mounts 2, are allowed to pass through the respective hollows of the cylindrical hollow bodies 10 until the flared flanges 18 are brought into contact with annular areas of the top surface of the header tank 1b around the respective protuberances 9 so as to lie in a plane generally parallel to the mounting flanges 11 as best shown in FIG. 4. At this time, the flared flanges 18, then deformed against their own resiliency so as to lie in that plane generally parallel to the mounting flanges 11, apply respective downwardly acting forces to the radiator assembly 1 to avoid any possible movement of the radiator assembly 1 independent of the upper elastic mounts 5 under the influence of vibrations acting during the operation of the automobile.

Furthermore, when each protuberance 9 is inserted in the associated elastic mount 5 as hereinbefore described, the cylindrical hollow body 10 contacts the outer peripheral surface of the respective protuberance 9 substantially only through the radially inwardly protruding crest 17 in the case of the embodiment shown in FIGS. 3 and 4, or through the radially inwardly protruding crests 17a in the case of the embodiment shown in FIGS. 5 and 6.

The provision of the crest 17, or the crests 17a, is advantageous in that, even when one or both of the protuberances 9 are formed on the top of the header tank 1b with their longitudinal axis slightly inclined relative to the radiator assembly 1 or even when the radiator assembly 1 is mounted on the upholding brackets 3 tilts with the protuberances 9 consequently aligned not exactly with the hollows of the respective cylindrical hollow bodies 10, the upper elastic mounts 5 can accommodate the respective protuberances 9. In other words, the provision of the crest 17, or the crests 17a, is effective to accommodate any possible error in mounting of the radiator with respect to the horizontal direction.

In fastening the hold-down plates 6 to the upper transverse brace 7, the bent end 6a in each hold-down plate 6 serves to facilitate the alignment of the slots 6f and 6g with mating holes defined in the top wall 7b of the transverse brace 7 because it is engaged against the side wall 7a of the upper transverse brace 7. Where a fine adjustment of the position of each of the elastic mounts 5 relative to the respective protuberance 9 is desired, it can readily be accomplished by loosening the bolts 13 to allow the repositioning of the respective hold-down plate 6 relative to the transverse brace 7 because of the employment of the slots 6f and 6g. Preferably, in order to impart a rigidity to the connection between each hold-down plate 6 and the transverse brace 7, the slots 6f and 6g are defined in the first flat end portion 6b on respective sides of the longitudinal sense of the respective hold-down plate and spaced a distance d one behind the other with respect to the direction towards the associated elastic mount 5 as best shown in FIG. 3.

From the foregoing description, it has now become clear that the radiator assembly 1 is resiliently supported at the four locations A, B, C and D by the automobile body structure with the lower protuberances 8 mounted on the up-holding brackets 3 through the lower elastic mounts or elastic collars 2 and with the upper protuberances 9 received in the upper elastic mounts 5. Accordingly, the transmission of jars and vibrations to the radiator assembly 1 during the operation of the automobile can be advantageously minimized and, therefore, the life time of the radiator assembly can be substantially prolonged.

Moreover, if for a given weight of the radiator assembly the coefficient of elasticity of each of the elastic mounts 2 and 5 is so selected as to satisfy a certain equation such as disclosed in the previously mentioned Japanese Laid-open Patent Publication No. 57-94223, the radiator assembly so mounted according to the present invention can serve as a dynamic damper effective to suppress the low frequency vibration generated in the automobile during the operation thereof. In view of this, the mounting flange 11 in each of the upper elastic mounts 5 is desired to have as small a coefficient of elasticity as possible without sacrificing the physical strength thereof necessary to support the radiator assembly 1 from above.

Thus, according to the present invention, the radiator assembly 1 can be given a latitude of movement within a limited distance in any direction. Moreover, the radiator assembly 1 can readily be installed within an engine compartment defined in the automobile body structure, merely by mounting it on the up-holding brackets 3 and then fastening each hold-down plate 6 to the upper transverse brace 7 after the respective protuberance 9 has been allowed to pass through the associated cylindrical hollow body 10. Because of the ease in mounting the radiator assembly 1, the mounting of the radiator assembly can be achieved with no intervention of manual labor, but by the aid of one or two computer-controlled industrial manipulators.

Although the present invention has fully been described in connection with the preferred embodiments thereof with reference to the accompanying drawings, it is to be noted that various changes and modifications are apparent to those skilled in the art. By way of example, although the lower elastic mounts or collars have been described as mounted on the respective up-holding brackets secured to the lower transverse brace, they may be mounted directly on the lower transverse brace depending on the design and/or position of the lower transverse brace in a particular design of the automobile body structure.

Moreover, although reference has been made to the use of the two upper elastic mounts 5 in combination with the two hold-down plates 6, the use of a single upper elastic mount in combination with a single hold-down plate may be possible.

Accordingly, such changes and modifications are to be understood as included within the scope of the present invention as defined by the appended claims unless they depart therefrom.

What is claimed is:

1. A resilient mounting for radiator assembly used in an automotive vehicle including relatively fixed upper and lower support members, which mounting comprises:
   a lower support means provided on the lower support member and including at least one cushioning member for the support of the radiator assembly from below;
   at least one generally cylindrical protruberance formed on a portion of the radiator assembly at a location opposite to the lower support means and extending upwardly from the radiator assembly;
   at least one generally elongated plate member secured at one end to the upper support member and protruding therefrom to a position immediately above the protuberance, said plate member having a mounting hole defined in a portion thereof adjacent to the other end thereof; and
   at least one elastic mount comprised of a generally cylindrical hollow body and a pliable mounting flange protruding radially outwardly from the hollow body, the pliable mounting flange having a region of reduced thickness, the hollow body having a lower end provided with an abutment engageable with an annular surface area of the radiator provided around the cylindrical protruberance, said elastic mount being mounted on the plate member with the outer periphery of said mounting flange engaged to a peripheral lip region of the plate member which defines the mounting hole, said protruberance being resiliently received in the hollow of the hollow body.

2. A resilient mounting as claimed in claim 1, wherein said elastic mount is of one-piece construction together with the hollow body and the mounting flange, the abutment comprising a pliable flared flange formed integrally with the lower end of the hollow body and extending from the lower end of the hollow body by diverging radially outwardly.

3. A resilient mounting as claimed in claim 2, wherein said region of reduced thickness a thin-walled area defined therein exteriorly adjacent the hollow body.

4. A resilient mounting as claimed in claim 2, wherein said mounting flange has at least two openings extending completely through the thickness of the mounting flange and spaced in a direction circumferentially of the hollow body.

5. A resilient mounting as claimed in claim 1, wherein said hollow body has at least one crest formed therein so as to protrude radially inwardly into the hollow of the hollow body, said protuberance being receiving in the hollow of the hollow body in resilient contact with the crest.

6. A resilient mounting as claimed in claim 5, wherein said elastic mount has a pliable flared flange protruding outwards from one end of the hollow body for covering the annular surface area of the radiator assembly around the protuberance.

7. A resilient mounting as claimed in claim 6, wherein the elastic mount is of one-piece construction together with the hollow body, the mounting flange, the crest and the flared flange.

8. A resilient mounting as claimed in claim 7, wherein said plate member is secured at said one end to the upper support member by means of at least one set of bolt and nut in the direction along the protuberance of the radiator assembly.

9. A resilient mounting for a radiator assembly used in an automotive vehicle including relatively fixed upper and lower support members, which mounting comprises:
   a lower support means provided on the lower support member and including at least one cushioning member for the support of the radiator assembly from below;
   at least one generally cylindrical protuberance formed on a portion of the radiator at a location opposite to the lower support means,
   at least one generally elongated plate member secured at one end to the upper support member by means of at least one set of bolt and nut and protruding therefrom to a position immediately above the protuberance, said plate member having a peripheral lip region defining a mounting hole, said mounting hole defined in a portion thereof adjacent to the other end thereof; and
   at least one elastic mount of one-piece construction including a generally cylindrical hollow body, a pliable mounting flange protruding radially outwardly from the hollow body, a plurality of circumferentially spaced crests integral with and extending radially inwardly from the hollow body into to hollow of the hollow body, and a pliable flared flange protruding outwards from one end of the hollow body, said elastic mount being mounted on the plate member with the other periphery of the mounting flange engaged to the peripheral lip region of the plate member which defines the mounting hole, said protuberance being received in the hollow of the hollow body in resilient contact with the crests while said flared flange is held in contact with an annular surface area of the radiator assembly around the protuberance, said mounting flange having a thin-walled area defined therein exterially adjacent to the hollow body.

10. A resilient mounting as claimed in claim 1, wherein said region of reduced thickness is a thin-wall area defined by a plurality of recesses.

* * * * *